(12) United States Patent
Juang et al.

(10) Patent No.: US 6,538,645 B1
(45) Date of Patent: Mar. 25, 2003

(54) COMPUTER INPUT SYSTEM UTILIZING A CAMERA TO SENSE POINT SOURCE

(75) Inventors: Dar-Chang Juang, Hsinchu (TW); Pao-Chyuan Chen, Chu-Pei (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 189 days.

(21) Appl. No.: 09/696,294

(22) Filed: Oct. 26, 2000

(51) Int. Cl.⁷ .............................................. G06K 11/06
(52) U.S. Cl. ................................. 345/179; 178/18.01
(58) Field of Search ............................ 345/179, 180; 178/18.01, 18.09, 18.08, 19.01, 19.03

(56) References Cited

U.S. PATENT DOCUMENTS

| | | | | |
|---|---|---|---|---|
| 5,617,312 A | * | 4/1997 | Lura et al. ................. | 345/157 |
| 5,831,601 A | * | 11/1998 | Vogeley et al. ........... | 178/18.01 |
| 6,021,417 A | * | 2/2000 | Massarksy .................. | 345/441 |
| 6,297,802 B1 | * | 10/2001 | Fujioka ...................... | 345/156 |
| 6,377,249 B1 | * | 4/2002 | Mumford ..................... | 345/173 |

* cited by examiner

Primary Examiner—Amare Mangistu
Assistant Examiner—Nitin Patel
(74) Attorney, Agent, or Firm—Bacon & Thomas

(57) ABSTRACT

A computer input system utilizing a camera to sense a point source includes a movable light emitting device, which is operated by the user to move and emit at least two lights of different colors. The computer input system further has a camera for capturing the light emitted by the movable light emitting device and transforming a captured light trace produced by the movable light emitting device to XY coordinate data, so as to perform a pointing input operation.

16 Claims, 4 Drawing Sheets

COMPUTER INPUT SYSTEM UTILIZING A CAMERA TO SENSE POINT SOURCE

BACKGROUND OF THE INVENTION

1. Field of the Invention

The present invention relates to a computer input system and, more particularly, to a computer input system which utilizes a camera to sense the light generated by a movable pen device as the point source.

2. Description of Related Art

In addition to using the keyboard for input operation, a personal computer is generally provided with a mouse as a pointing input device for entering commands or data. By detecting the relative position of the mouse and executing the corresponding driver software, the mouse cursor on the computer can be moved and input operation can be achieved by clicking the button of the mouse. Moreover, with the use of recognition software, a hand-written input application can be performed. As such, the use of the computer is even easier.

However, the use of the conventional pointing input device is not satisfactory. For example, the connection cable of the mouse is susceptible to tangling, and the mouse can only be operated on a mouse pad or a flat surface. Furthermore, the use of a mouse for the hand-written input application is deemed inconvenient.

Recently, due to the progress of multimedia applications, an audio/video device, such as a camera, has been provided on a computer. However, the camera may become a redundant device is the computer is used simply for a typical word processing applications. Therefore, it becomes an important issue to promote the convenience of using the pointing input device and fully utilize the resources of the computer.

SUMMARY OF THE INVENTION

It is an object of the present invention to provide a computer input system utilizing a camera to sense a point source, such that the user can conveniently perform the pointing input operation and hand-written input operation.

To achieve the above object, the computer input system in accordance with the present invention includes a movable light emitting device and a camera connected to a computer. The movable light emitting device is provided to be operated for moving and emitting at least two lights with different colors. The camera is provided for capturing the light emitted by the movable light emitting device, distinguishing the color of the light, and transforming a captured light trace produced by the movable light emitting device to XY coordinate data, so as to perform a pointing input operation to the computer.

The above and other objects, features and advantages of the present invention will become apparent from the following detailed description taken with the accompanying drawings.

DETAILED DESCRIPTION OF THE PREFERRED EMBODIMENTS

Figure 1:
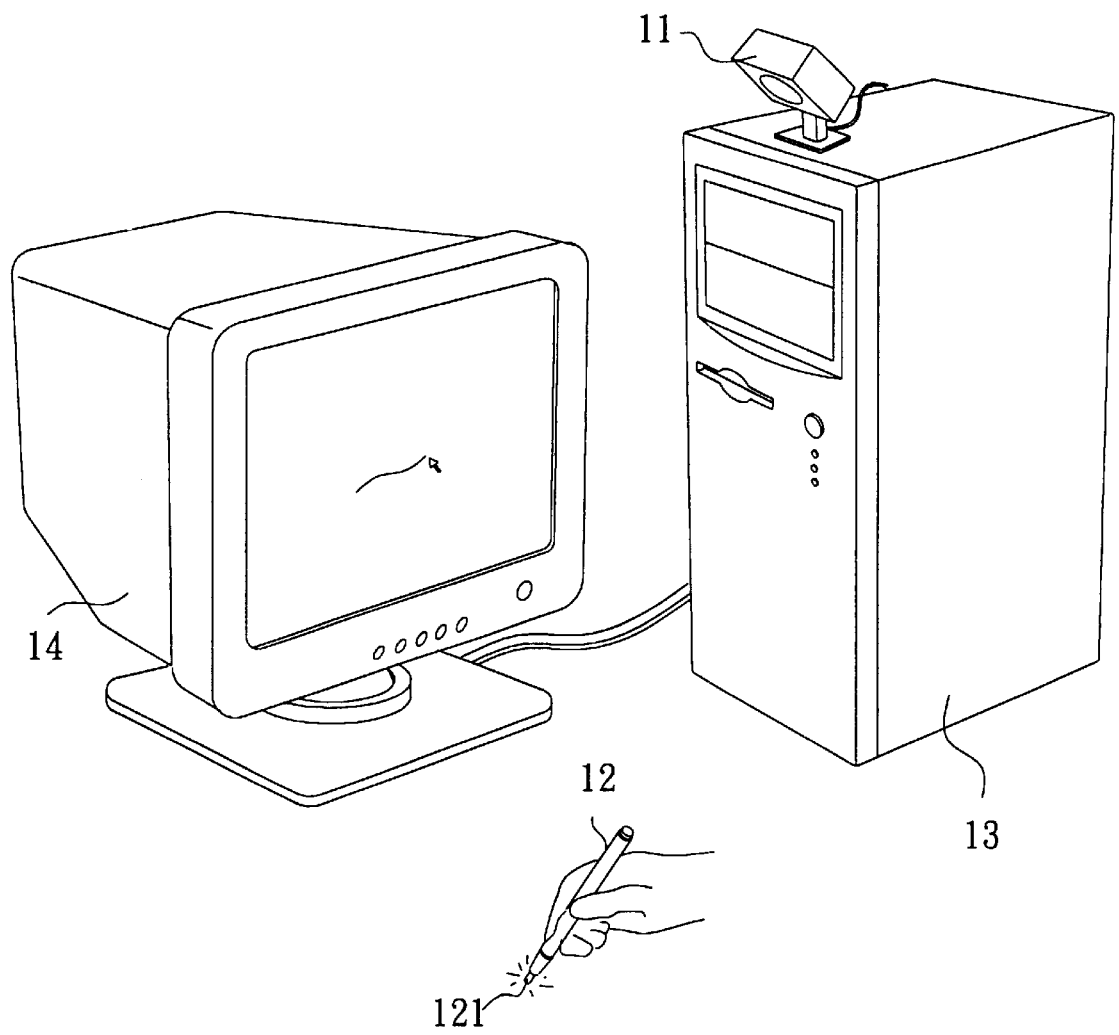
FIG. 1 is a perspective view showing the usage status of the computer input system in accordance with the present invention.

Referring to FIG. 1, there is shown a computer input system utilizing a camera to sense the point source in accordance with a preferred embodiment of the present invention, which includes a camera 11 (or other suitable image catching devices) connected to a personal computer system, and a movable light emitting device 12 provided as a pointing input device. The camera 11 is used to detect the position of the movable light emitting device 12 for performing an input operation to the personal computer. Preferably, the movable light emitting device 12 has a pen shape for being easily held by a user to operate. On one end of the movable light emitting device 12, a light emitting diode (LED) 121 is arranged as a light source. Preferably, the camera 11 is disposed on the computer host 13, the monitor 14, or other appropriate locations.

The camera 11 can be used for general multi-media applications, for example, capturing the user's image for image processing, performing a video communication or a video conference. When the camera is switched to face toward the movable light emitting device 12 operated on the surface of, for example, a desk for performing the pointing input operation, the camera functions as a mouse device by utilizing its image sensor for sensing and distinguishing the R(Red), G(Green), and B(Blue) colors. That is, the camera 11 is able to capture the high output level signal of the moving trace of the light point generated by the LED 121 by driving associated hardware and software, and utilizing the movable light emitting device 12, whose LED 121 may generate light with a single color or multiple colors, as an pointing input device. The captured signal is thus converted into XY coordinate data for being processed to accomplish the pointing input operation.

Figure 2:
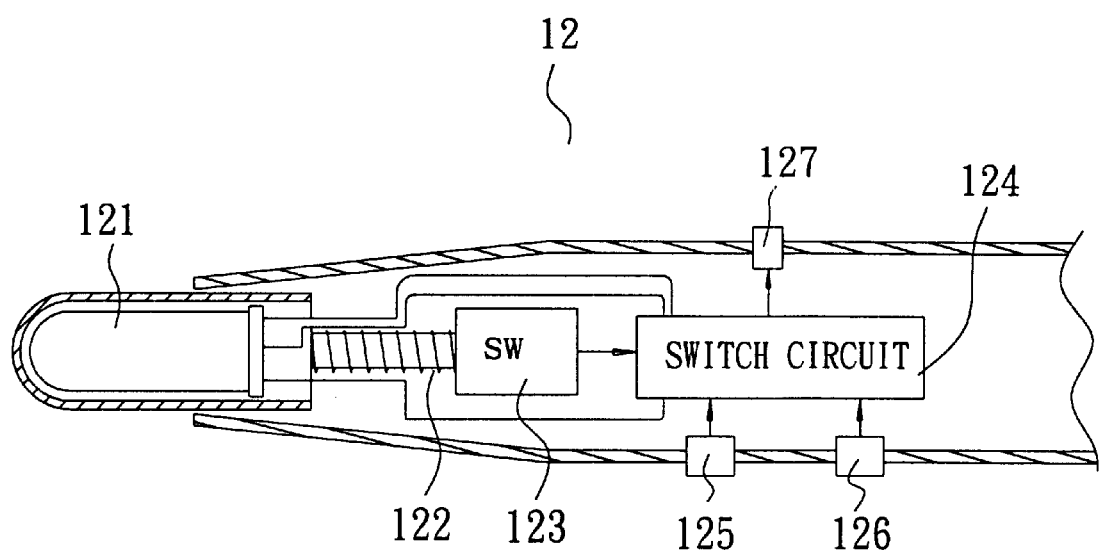
FIG. 2 schematically illustrates the structure of a movable light emitting device in accordance with the present invention.

FIG. 2 schematically illustrates the structure of the movable light emitting device 12, wherein the LED 121 is disposed on the penpoint portion. A spring 122 is arranged in the pen holder portion, such that, when the penpoint is pressed, a switch 123 is conducted thereby activating a switch circuit 124 to turn on the LED 121, which is capable of generating green light and red light (or generating green light, red light, and blue light). In a general mouse pointer movement, a green light is emitted from the LED 121 when switch circuit 124 is enabled. Thereafter, the color of the light emitted from the LED 121 is sensed and identified by camera 11. Alternatively, it is applicable to emit a red light from the LED 121 for the general pointer movement operation. The movable light emitting device 12 further includes two buttons 125 and 126. When one of the button 125 is depressed, the switch circuit 124 drives the LED 121 to emit red light for being captured and identified by the camera 11, so as to perform a simulation of clicking the left button of a mouse. Similarly, when the other button 126 is depressed, the switch circuit 124 drives the LED 121 to emit red light and green light at the same time for being captured and identified by the camera 11, so as to perform a simulation of clicking the right button of a mouse. In addition, it is also applicable to emit a blue light from the LED 121 to perform the simulation of clicking the right button of a mouse.

The movable light emitting device 12 may further include a button 127, which when depressed, causes the switch circuit 124 to drive the LED 121 to continuously emit green light. The LED 121 is turned off by depressing the button 127 again. As such, it is not necessary to keep pressing the movable light emitting device 12 on an object for performing the pointer movement operation. Instead, the user may simply press the button 127 and move the movable light emitting device 12 in the air for performing the general pointer movement operation. After the button 127 is depressed to emit green light, the user may further press button 125 or 126 for enabling switch circuit 124 to cause the LED 121 to change the color of the light, so as to perform a simulation of clicking the left or right button of a mouse.

Figure 3:
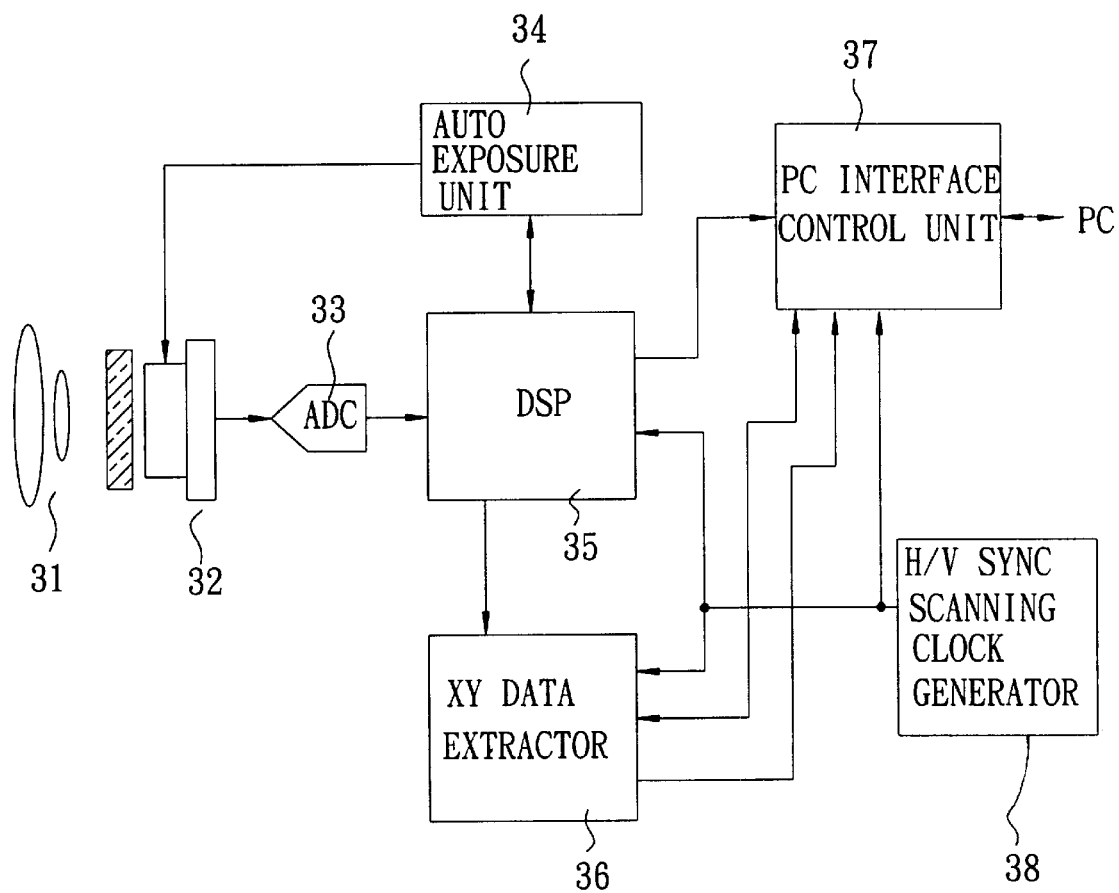
FIG. 3 is a functional block diagram of a camera in accordance with the present invention.

Referring to FIG. 3, there is shown the functional block diagram of the camera 11, which includes a lens 31, an image sensor 32, an analog/digital converter (ADC) 36, an automatic exposure unit 34, a digital signal processor 35, a XY-coordinate data extractor 36, a personal computer interface control unit 37, and a H/V (horizontal/vertical) synchronous scanning clock generator 38. The H/V synchronous scanning clock generator 38 is provided to support pixel clock, horizontal synchronous (HSYNC) signal, and vertical synchronous (VSYNC) signal to the camera 11.

In using the camera 11 and a personal computer to perform the pointing input operation, the camera 11 can be switched to be a general camera or a mouse camera by toggling a hot key. When being switched to be a mouse camera, the personal computer first locates the mouse pointer in the center of the screen, and at the same time, utilizes its bus interface to switch the camera 11 to a mouse mode through the personal computer interface control unit 37. Also, the exposure value of the automatic exposure unit 34 is automatically lowered for effectively distinguishing the light spot of LED 121 from the background noise. Then, the digital signal processor 35 processes the light spot fetched by the lens 31 and image sensor 32 for generating corresponding R(red), G(green) and B(blue) data, which is sent to XY-coordinate data extractor 36.

Figure 4:
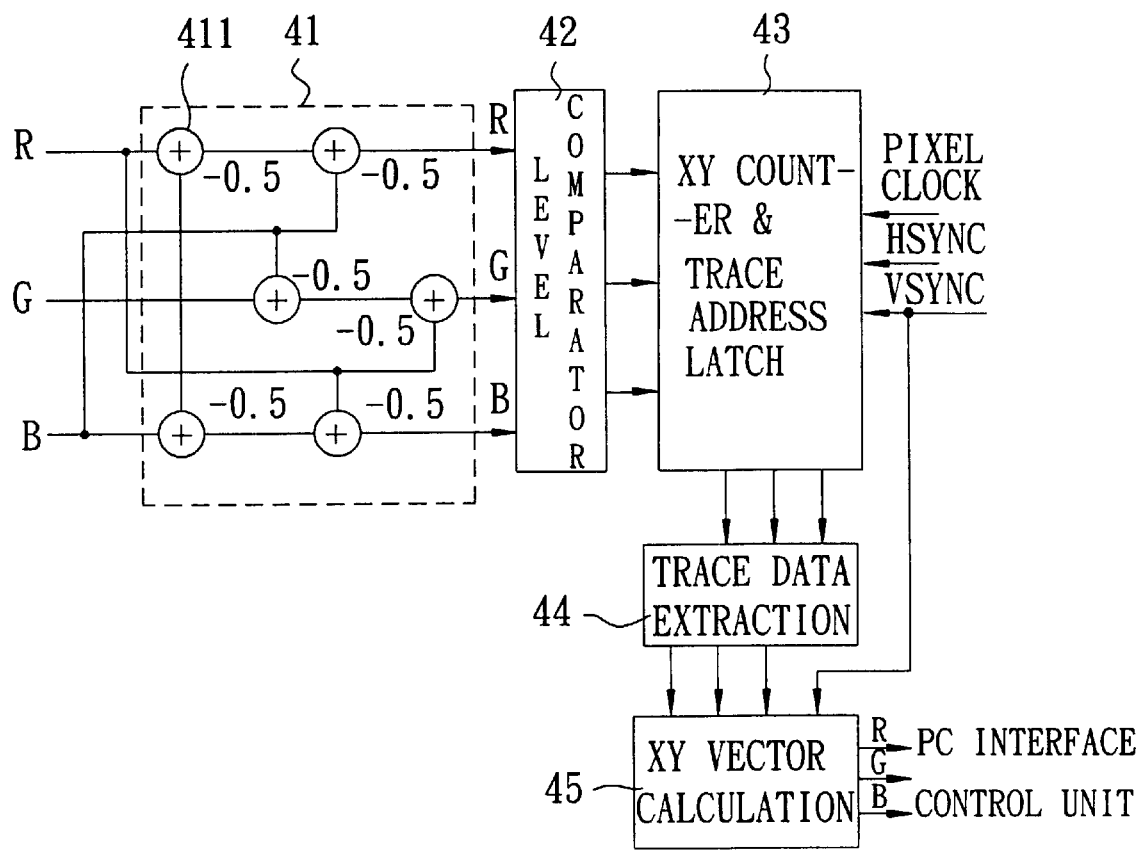
FIG. 4 is a circuit diagram of a XY-coordinate data extractor in the camera.

Referring to FIG. 4, the XY-coordinate data extractor 36 has a background noise suppressor 41 consisting of a plurality of subtractors 411. As such, when detecting a light spot of a specific color, the subtractors 411 are provided to attenuate lights with other colors, so as to effectively extract the signal of the light trace of the LED 121. The output signal from the background noise suppressor 41 is processed by a level comparator 42 for identifying the light trace of the LED 121.

Then, the identified light trace is sent to a XY counter and address latch circuit 43 to trigger a counting operation driven by the pixel clock, HSYNC, and VSYNC, so as to determine and latch a two-dimensional position of the light trace signal. This two-dimensional position data of the light trace signal is then processed by a trace data extraction circuit 44 for being automatically determined and switched to a 3×3 or 5×5 matrix. The center point of the matrix is thus regarded as the precise trace data of the mouse pointer. As a result, the problem of having several pixels focused and formed on the image sensor 32 from one LED light spot can be avoided, and a precise LED light trace data of the R,G,B colors is obtained.

The precise LED light trace data is then processed by a XY vector calculation circuit 45 to determine the vectored data of the LED light trace under the control of VSYNC signal. Moreover, the corresponding H/V signals may be reversed for accommodating to the orientation of camera 11. As such, the vectored data of the LED light trace is sent to the personal computer for being provided as the moving data of the mouse pointer via the personal computer interface control unit 37. The personal computer interface control unit 37 can determine the presence of the vectored data of the LED light trace for the R,G,B colors in order to determine the status of mouse pointer represented by the combination of the colors of the lights. For example, the presence of only a green vectored data refers to a typical pointer movement operation. The presence of only a red vectored data refers to a right-button clicking operation. The presence of both green and red vectored data refers to a left-button clicking operation.

The sampling of the above-described light trace vectored data is controlled by the a VSYNC signal. The sampling speed is 30 or 60 frames/sec since every frame is sampled once. The vectored data of each frame takes a cross point where the frame joins the previous one as a starting point to describe the trace vector.

In view of the foregoing, it is to be appreciated that the present invention utilizes a camera 11 capable of distinguishing lights and extracting a coordinate position, and a movable light emitting device 12 as a pointer to provide a very convenient pointing input system. The user may operate the movable light emitting device 12 as a mouse to perform a pointing input operation. Furthermore, the movable light emitting device 12 is not limited to operate on a mouse pad or a flat surface, and there is no wire connection between the movable light emitting device 12 and the computer so that the problem of mouse cable tangles can be eliminated. The user can even move the movable light emitting device in the air to perform a pointing input operation. In addition, by installing an associated recognition software in the computer, the pointing input system of the present invention can be provided as a hand-written input system without the need for additional hardware.

While the invention herein disclosed has been described by means of specific embodiments, numerous modifications and variations could be made thereto by those skilled in the art without departing from the scope and spirit of the invention set forth in the claims.

What is claimed is:

1. A computer input system comprising:
   a movable light emitting device adapted to be operated for moving and emitting at least two lights with different colors; and
   a camera adapted to be connected to a computer for capturing light emitted by the movable light emitting device and transforming a captured light trace produced by the movable light emitting device to XY coordinate data, so as to perform a pointing input operation,
   wherein, when the penpoint portion is pressed, the movable light emitting device turns on the light emitting diode to emit light of a first color for being captured by the camera, said light being distinguished and identified by a signal processor, so as to perform a pointer movement operation.

2. The computer input system as claimed in claim 1, wherein the movable light emitting device has a light emitting diode for generating a light spot.

3. The computer input system as claimed in claim 2, wherein the movable light emitting device is of a pen shape and the light emitting diode is provided on a penpoint portion.

4. The computer input system as claimed in claim 3, wherein the movable light emitting device further has a first button which is depressed to cause the light emitting diode to emit light with a second color for being captured and identified by the camera, so as to perform a simulation of clicking the left button of a mouse.

5. The computer input system as claimed in claim 4, wherein the movable light emitting device further has a second button which is depressed to cause the light emitting diode to simultaneously emit lights with the first and second colors for being captured and identified by the camera, so as to perform a simulation of clicking the right button of a mouse.

6. The computer input system as claimed in claim 4, wherein the movable light emitting device further has a second button which is depressed to cause the light emitting diode to emit light with a third color for being captured and identified by the camera, so as to perform a simulation of clicking the right button of a mouse.

7. The computer input system as claimed in claim 3, wherein the movable light emitting device further has a third button which is depressed to cause the light emitting diode to continuously emit light with a first color for being captured and identified by the camera, so as to perform a pointer movement operation, the light emitting diode being turned off when the third switch is depressed again.

8. The computer input system as claimed in claim 7, wherein, after the third button is depressed to emit the light with the first color, the first button or the second button can be depressed to change the color of the emitted light for being captured and identified by the camera, so as to perform a simulation of clicking the left button or the right button of a mouse.

9. The computer input system as claimed in claim 1, wherein the XY-coordinate data extractor further comprises a trace data extraction circuit for receiving the two dimensional position data of the light trace for being automatically determined and switched to a 3×3 or 5×5 matrix whose center point is regarded as precise trace data of a mouse pointer.

10. The computer input system as claimed in claim 9, wherein the XY-coordinate data extractor further comprises a XY vector calculation circuit for receiving the precise trace data to determine vectored data of the light trace produced by the light emitting diode, the vectored data being sent to a computer for being provided as moving data of the mouse pointer via the personal computer interface control unit.

11. A computer input system comprising:

a movable light emitting device adapted to be operated for moving and emitting at least two lights with different colors; and a camera adapted to be connected to a computer for capturing light emitted by the movable light emitting device and transforming a captured light trace produced by the movable light emitting device to XY coordinate data, so as to perform a pointing input operation, wherein the camera comprises a lens, an image sensor, an analog/digital converter, an automatic exposure unit, a digital signal processor, and an XY-coordinate data extractor, such that, when the camera is switched to operate as a mouse, the exposure value of the automatic exposure unit is lowered, and the digital signal processor processes the light spot fetched by the lens and image sensor for generating corresponding red, green and blue data, which is sent to the XY-coordinate data extractor for producing coordinate data.

12. The computer input system as claimed in claim 11, wherein the camera further comprises a personal computer interface control unit adapted for interfacing to a computer.

13. The computer input system as claimed in claim 11, wherein the camera further comprises a horizontal/vertical synchronous scanning clock generator for providing a pixel clock, a horizontal synchronous signal, and a vertical synchronous signal.

14. The computer input system as claimed in claim 13, wherein the XY-coordinate data extractor comprises a background noise suppressor consisting of a plurality of subtractors, such that, when detecting a light spot of a specific color, the subtractors are provided to attenuate lights with other colors.

15. The computer input system as claimed in claim 14, wherein the XY-coordinate data extractor further comprises a level comparator for processing signals output from the background noise suppressor to identify a light trace of the light emitting diode.

16. The computer input system as claimed in claim 15, wherein the XY-coordinate data extractor further comprises a XY counter and address latch circuit for receiving the light trace produced by the light emitting diode to trigger a counting operation, so as to determine and latch a two-dimensional position data of the light trace.

* * * * *